Patented Mar. 15, 1949

2,464,265

UNITED STATES PATENT OFFICE 2,464,265

MANUFACTURE OF TRICHLOROMETHYL DI(PARA-CHLOROPHENYL)METHANE

Norman E. Searle, Wilmington, Del., assignor to E. I. du Pont de Nemours & Company, Wilmington, Del., a corporation of Delaware No Drawing. Application March 21, 1944, Serial No. 527,515

3 Claims. (Cl. 260—649)

This invention relates to improvements in chemical processes for the condensation of a chloral-yielding compound and an aromatic compound having replaceable nuclear hydrogen in the presence of sulfuric acid as a condensing agent. It is particularly directed to such processes in which the product is brought into a liquid state and separated from the reaction mixture by gravity separation.

It is known that chloral may be condensed with an aromatic compound in the presence of sulfuric acid to give a product of the trichloromethyl diaryl methane type. Ber. 5, 1098; Ber. 7, 1181; U. S. 1,707,181, and U. S. 2,329,074. In such prior art processes the product has appeared as crystals in aqueous sulfuric acid and was recovered by drowning the reaction mixture in water and filtering off the crystals. Such processes require large volumes to be handled in filtration and also excessive cooling facilities to dissipate the heat of dilution of sulfuric acid.

I have now found that the disadvantages of the prior art may be avoided and trichloromethyl diaryl methanes obtained simply and effectively from the reaction mixture obtained by condensing the chloral-yielding compound with an aromatic compound having replaceable nuclear hydrogen in the presence of sulfuric acid as a condensing agent by bringing the product into a liquid condition as by the application of heat or the introduction of a solvent, or by a combination of these steps, and thereafter separating the product phase from the aqueous acid phase by gravity separation.

By bringing the product into a liquid state and separating it from the aqueous sulfuric acid by gravity separation I avoid the difficulties heretofore encountered in separating the product from the aqueous sulfuric acid. Moreover, I have found quite unexpectedly that the product obtained in this manner is relatively pure as compared with the product obtained by the prior art method. It appears that when the product is brought into a liquid state in contact with the sulfuric acid condensing agent the sulfuric acid scrubs out some of the impurities which otherwise would have remained in the product. Thus in the gravity separation of the aqueous sulfuric acid phase from the liquid product phase impurities which otherwise would have contaminated the product would go off in the worthless aqueous phase. Thus the processes of my invention provide new and unexpected advantages as compared with the prior art processes.

In carrying out the processes of my invention I may effect condensation of a chloral-yielding compound and an aromatic compound having replaceable nuclear hydrogen using sulfuric acid as the condensing agent according to any of the methods well known in the art, as noted above. In a broad aspect of the invention any suitable method for effecting the condensation in the presence of sulfuric acid may be employed. I next bring the product into a liquid state, either during the process of the condensation or subsequent thereto, by heating the reaction mixture sufficiently to fuse the product or by adding a solvent for the product, as required to liquefy it, or by a combination of heat and solvent such as will make it possible to effect liquefaction at any desired temperature, and next effect separation of the two phases by gravity separation. The liquefied product phase separates as a layer distinct from the aqueous sulfuric acid phase and the two accordingly may be simply and effectively separated. By this combination of steps the product is separated from the sulfuric acid and washed free of some of the impurities which otherwise would have contaminated it.

The advantages of my invention, particularly with respect to obtaining a relatively pure product, are realized to the fullest extent by scrubbing the liquefied product with strong sulfuric acid, e. g., of at least 80% strength. I have found, for example, if a product obtained in crystalline form by drowning the reaction mixture in water and filtering it is liquefied and scrubbed with strong sulfuric acid dark-colored impurities are dissolved in the sulfuric acid and the product obtained in a relatively pure state. Moreover, the liquefied product disperses very easily in sulfuric acid of this strength so that intimate scrubbing is easily obtained with a minimum of agitation. Sulfuric acid of at least 95% strength, and preferably not more than 98% strength, is of advantage in effecting the condensation because with acid of this strength the condensation reaction will maintain itself without the necessity of heat being applied and sulfonation of the reagents or product is at a minimum for a self-propagating reaction. Thus in a preferred combination of my invention unexpected cooperative results are obtained by effecting the condensation in the presence of sulfuric acid of a strength between at least 95% and not more than 98% strength, liquefying the product, scrubbing the liquefied product with sulfuric acid of that strength, and separating the liquefied product phase from the aqueous sulfuric acid phase by gravity separation.

In carrying out the processes of my invention especially in the presence of strong sulfuric acid of the above described preferred procedure it is desirable to use a solvent in order to liquefy the product. If heat alone is utilized for this purpose undesirable oxidation and sulfonation reactions may take place. By including a quantity of a solvent for the product it may be brought into a liquid condition at a lower temperature, thus obviating these difficulties. Any inert solvent, suitably the hydrocarbon and chlorinated hydrocarbon solvents, may be used.

The invention may be more fully understood by reference to the following examples in which the parts are by weight unless otherwise specified:

*Example 1*

To a mixture of 147.4 parts chloral and 338 parts chlorobenzene there was added 990 parts of 98% sulfuric acid with agitation and with cooling such that the temperature over a period of 3 hours rose from 24.5° C. to 33° C. and after 4 hours and 40 minutes reached 37° C. There was then added 135 parts of water to raise the temperature and to break the emulsion. The water layer was drawn off at 75 C. and the product washed twice with 500 parts of water, and again with 500 parts of water containing about 0.3% ammonia, as NH3, to pH 8. The product was washed twice more and subjected to vacuum distillation with a final temperature of 110° C. and a final pressure of 44 mm. mercury. There was distilled over 60 parts of chlorobenzene and 56 parts of water, and there was recovered 302 parts of a colorless liquid which set at 87.1° C., giving a yield at 85% based on chloral.

In this preparation, the acid phase was diluted to raise the temperature sufficiently to maintain the product layer in the liquid state and at the same time to reduce the acid concentration in order to avoid excessive sulfonation at the elevated temperature. After dilution the acid layer contained about 80 to 85% H2SO4.

It will be observed that in the washing of the product phase a substantial quantity of water (56 parts were recovered in the distillation) was occluded or emulsified. It may be separated from the chlorobenzene distillate by gravity separation and the chlorobenzene so recovered recycled to the process.

It may be observed also that sulfonation of chlorobenzene takes place in the reaction, thus giving a lower yield based on chlorobenzene (69%). The sulfonated product being water-soluble is separated during the washing so that build-up of sulfonates by recycling chlorobenzene to the process is avoided.

In place of adding water to the reaction mixture to raise the temperature it may simply be heated or, alternatively, additional chlorobenzene or other solvent may be added. When so liquefied the product phase may be separated from the aqueous acid phase simply by gravity separation.

*Example 2*

To a mixture of 270.2 parts chlorobenezene and 147.4 parts of chloral there was added 400 parts of 98% sulfuric acid with agitation and cooling sufficient to maintain the temperature at about 25° C. This temperature was maintained for a period of 40 minutes after which there was started a gradual addition of 25% oleum. There was gradually and uniformily added 320 parts of 25% oleum over a period of one hour and forty-five minutes. After one hour and twenty-five minutes separation of crystals of product was observed and the oleum addition momentarily stopped to introduce an additional 110 parts of chlorobenzene in order to dissolve the crystals. There is maintained throughout the entire course of the reaction sufficient agitation to obtain a good emulsion of the product phase in the aqueous sulfuric acid phase. The added chlorobenzene is for the purpose of maintaining the desired emulsion. After completion of the oleum addition an additional 110 grams of chlorobenzene was added to preserve the desired state of emulsion and the reaction was continued for approximately two hours and fifteen minutes at which time an additional 27.5 parts of chlorobenzene was added and the temperature of the mixture raised to 45° C. to liquefy the product phase which was then separated from the aqueous acid phase by gravity separation.

The product phase was then washed 4 times with 400-part portions of warm water with the last portion containing 0.5 per cent ammonia, as NH3. After two more washings the product phase was subjected to vacuum distillation with a final temperature of 110° C. and a final pressure of 15 mm. mercury. There was distilled over 183 parts of chlorobenzene and 18 parts of water. There was obtained 291 parts of a water-white liquid having a setting point of 89.2° C. and yield of 82% based on chloral.

*Example 3*

To a mixture of 540 parts of chlorobenzene and 295 parts of chloral there was added 800 parts of 98% sulfuric acid with agitation and cooling sufficient to maintain the temperature at about 25° C. This temperature was maintained for a period of 30 minutes after which there was started a gradual addition of 20% oleum. There was gradually and uniformly added 837 parts of 20% oleum over a period of 3.6 hours and agitation and cooling was continued for an additional 3 hours while maintaining a temperature of 25° C. throughout. After 2¼ hours separation of crystals of the product was observed and the oleum addition momentarily stopped to introduce an additional 200 parts of chlorobenzene in order to dissolve the crystals. There is thus maintained throughout the entire course of the reaction sufficient agitation to obtain a good emulsion of the product phase in the aqueous sulfuric acid phase. The added chlorobenzene is for the purpose of maintaining the desired emulsion. An additional 200 parts of chlorobenzene was added about 40 minutes later to maintain the desired emulsion. The reaction mixture was then heated to 40° C. and allowed to settle for a period of one hour and the acid layer drawn off.

The product phase was then washed six times with 1000-part portions of warm water while maintaining the product phase at a temperature of 65° C. In the fifth and sixth washings there were included 1.4 cc. and 0.5 cc. per pound, of 28% ammonium hydroxide solution, respectively.

The washed product was then subjected to vacuum distillation with a final temperature of 90° C. and a final pressure of 26 inches mercury gauge. During the distillation the temperature ranged from about 80 to about 95° C. and the pressure from 10 to 26 inches mercury gauge.

The final traces of chlorobenzene may be removed by sparging the still residue with air or other inert gas, or preferably by introducing steam.

By the procedure of this example there was obtained 640 parts of a clear liquid having a setting point of 88.9° C. in a yield of 90.1% based on chloral.

In the processes of Examples 2 and 3 the quantity of 98% sulfuric acid and quantity of oleum are calculated so as to give as nearly as possible an acid strength throughout the reaction of about 98%. In these quantities there is taken into account the water formed in the interaction of the chloral and the chlorobenzene, the water formed as a result of sulfonation reactions, and the loss of sulfuric acid resulting from sulfonation. Thus while the over-all average concentration of the sulfuric acid is somewhat higher than 98% (about 99%) the actual concentration throughout the reaction is very closely maintained at about 98%.

While I have disclosed my invention with reference to particular examples it is to be understood that it is not limited to any of the details thereof but that variation may be made without departing from the spirit and scope of the invention as long as the condensation is effected in aqueous sulfuric acid, the product liquefied and separated from the aqueous sulfuric acid by gravity separation.

In the place of chloral in the processes of the examples there may be substituted other chloral-yielding compounds, such as chloral hydrate, chloral alcoholate, and chloral acetal. These materials yield chloral in the presence of sulfuric acid and consequently may be substituted in the reaction if suitable adjustments are made for the amount of water liberated and the amount of sulfuric acid used in the process of converting the material to chloral. The reaction in all cases appears simply to be the reaction between chloral and the aromatic compound and the other materials may be considered in effect as alternative ways of introducing chloral into the reaction mixture.

In place of chlorobenzene there may be substituted other aromatic compounds such as benzene, chlorobenzene, methoxy benzene, phenetol, phenol, toluene, naphthalene, and like homologues and derivatives of benzene. Aromatic compounds of the types known to react with chloral according to the general equation given above may be used although in some cases adjustments may be necessary, as, for example, the inclusion of a solvent to maintain a proper state of emulsion, in view of the particular properties of the compound.

The stoichiometric proportions as indicated by the equation given above are one mole of chloral and two moles of the aromatic compound. While the process may be effected easily and economically in these proportions and while the prior art has used these proportions apparently to facilitate recovery of a product free of chlorobenzene, it is nonetheless undesirable to operate with stoichiometric proportions. Even when the reaction is closely controlled and the acid strength is limited carefully within the limits of 95% strength and not greater than 98% strength, considerable sulfonation of chlorobenzene results. It is accordingly desirable to have present initially or have added during the reaction such chlorobenzene as may be required to compensate for any loss of chlorobenzene by sulfonation. Additionally it is desirable to have present an excess of chlorobenzene, that is, chlorobenzene in excess of the quantity required for reacting with the chloral and sulfuric acid. This excess chlorobenzene remains unreacted in the process and functions in several different days to give improved results. In addition to the simple mass effect it has in increasing and accelerating the reaction with chloral, toward the end of the reaction it functions as a solvent for the product making it easier to liquefy the product preparatory to effecting mechanical separation of the product phase from the aqueous acid phase, and if incorporated in the reaction in sufficient amount will prevent any substantial separation of the product throughout the reaction. The amount of the excess may be varied considerably and as the amount of sulfonation is not a certain factor it will be ordinarily sufficient if the chlorobenzene is present in proportions of at least about 2.2 moles for each mole of chloral and it will not ordinarily be necessary to have it present in excess of 5 moles for each mole of chloral.

It is desirable to introduce the excess chlorobenzene periodically throughout the reaction as in this way sulfonation is minimized. Thus in the preferred operation the excess chlorobenzene is present initially in an amount insufficient to keep the product from crystallizing out and is added in additional amounts as required practically to prevent this.

In place of using an excess of chlorobenzene there may be substituted an appropriate quantity of any suitable solvent for the product, such as the usual hydrocarbon and chlorinated hydrocarbon solvents. The chlorobenzene or other reagent aromatic compound if it has solvent properties for the product is more desirable, however, because the number of ingredients to be separated from the products are limited, the effect of mass action is obtained and the indeterminate sulfonation factor is automatically taken care of.

The amount of sulfuric acid required for carrying out the process depends upon the amount of water of formation liberated in the condensation reactions involved and the amount of water introduced from extraneous sources. To illustrate, if chloral is used the condensation with chlorobenzene liberates one mole of water for each mole of chloral. Also, as sulfonation takes place one mole of water is liberated for each mole of chlorobenzene sulfonated and at the same time the content of the sulfuric acid is reduced by one mole. Also, chlorobenzene as recovered and recycled may introduce considerable water into the process. Those skilled in the art will be able to determine with a little experience the quantities of sulfuric acid required, bearing in mind that if the spent acid at any time during the process, that is, the acid which has become nearer the lower limit of 95% strength, is fortified by sulfur trioxide either as such or in oleum, a lesser quantity of acid will be required.

If chloral hydrate is used in the process allowance must be made for the additional mole of water liberated. Similarly, if chloral alcoholate is used in the process there will be an additional mole of water and also an additional mole of sulfuric acid used up in esterification.

If 98% sulfuric acid is used the amount required may be introduced altogether. Without taking into account sulfonation or carry-over of water by recycling chlorobenzene, the theoretical quantities of 98% acid may be determined by the formula $$X = \frac{0.95y}{3}$$

where X equals the moles of acid required per mole of chloral or its equivalent and $y$ equals the grams of water liberated per mole of chloral or its equivalent. Thus one mole of chloral would require 5.7 moles of 98% acid (570 grams) and chloral hydrate would require twice that much (1140 grams). Chloral alcoholate would require an additional mole (100 grams) of 98% acid thus making a total of 1240 grams. These quantities may be augmented as required in view of sulfonation and water carry-over.

It is not necessary that all of the sulfuric acid be added at one time and, in fact, the process may be started with any amount of sulfuric acid of strength between at least 95% and 98% strength which will provide a workable volume of emulsion. Under such conditions the process will automatically take care of itself. Such quantities of chlorobenzene and chloral as cannot be taken up in the emulsion will remain as a separate phase unless sufficient agitation is employed to effect dispersion of one phase in the other.

In place of using 98% acid to maintain the strength of the acid in the dispersion medium it may be fortified by sulfur trioxide either as such or as oleum. The acid layer may be withdrawn and fortified or the oleum or sulfur trioxide introduced directly into the emulsion layer. Care, however, should be taken that the strong acid, that is, oleum or sulfur trioxide (liquid), does not come in direct contact with the organic layer since experience has shown a high rate of sulfonation takes place between chlorobenzene and oleum or sulfur trioxide with the result that both are degraded rapidly to an acid of about 98% strength where sulfonation no longer appears to take place with any great rapidity. Thus in processes of the invention, in which the strength of the acid in contact with chlorobenzene is always maintained at 98% strength or below, sulfonation is readily controlled and limited to a minimum commensurate with spontaneous condensation of the reagents.

When the acid concentration is maintained above 95% strength the reaction proceeds spontaneously at ordinary temperatures, and even down to 10° C. or less, without the application of heat. Under these conditions the heat liberated by the reaction is sufficient to perpetuate it, and, as a matter of fact, may be more than sufficient, especially with the higher strength acid (98%). In the normal operation of the process, therefore, the reaction should be effected under conditions of heat exchange suitable to dissipate the surplus heat of reaction and to prevent the temperature of the reaction mixture from becoming excessive. Ordinarily it is desirable to keep the reaction temperature below about 40° C. Though temperatures higher may be used where loss of yield and degradations of the product are not consequential, at higher temperatures objectionable reaction, such as sulfonation of the product, dehydrohalogenation of the product, and oxidation of chloral, are likely to take place. The temperature is therefore reasonably critical within limits of about 10 to about 40° C.

I claim:

1. In a process for the manufacture of trichloromethyl di(para-chlorophenyl)methane wherein the reactants, chloral and monochlorobenzene, are emulsified in concentrated sulfuric acid to form a reacting mass, wherein monochlorobenzene is present initially in the reacting mass in amount insufficient to keep trichloromethyl di(para-chlorophenyl)methane from crystallizing out during the reaction, and wherein additional monochlorobenzene is added during the reaction to serve as solvent for part but not all of the trichloromethyl di(para-chlorophenyl)methane formed in the condensation reaction, the improvement which comprises raising the temperature of the reacting mass when the condensation is substantially complete to liquefy all the trichloromethyl di(para-chlorophenyl)methane and to form a two-phase liquid system, one phase containing trichloromethyl di(para-chlorophenyl)methane and unreacted monochlorobenzene and the other phase containing aqueous sulfuric acid and sulfonated monochlorobenzene, allowing separation of the liquid system into two layers by the action of gravity, one layer consisting of the phase containing trichloromethyl di(para-chlorophenyl)methane and unreacted monochlorobenzene and the other layer consisting of the phase containing aqueous sulfuric acid and sulfonated monochlorobenzene and recovering the layer containing trichloromethyl di(para-chlorophenyl)methane.

2. In a process for the manufacture of trichloromethyl di(para-chlorophenyl)methane wherein the reactants, chloral and monochlorobenzene, are emulsified in 95 to 98 per cent sulfuric acid at a temperature of 10 to 40° C. to form a reacting mass, wherein monochlorobenzene is present initially in the reacting mass in amount insufficient to keep trichloromethyl di(para-chlorophenyl)methane from crystallizing out during the reaction, and wherein oleum and additional monochlorobenzene are added during the reaction while agitating and maintaining the temperature of the reacting mass at 10 to 40° C., the oleum being added to maintain the sulfuric acid strength in the reacting mass at from 95 to 98 per cent sulfuric acid, and the additional amount of monochlorobenzene being added to compensate for loss of the reactant monochlorobenzene by sulfonation, to serve as a solvent for part but not all of the trichloromethyl di(para-chlorophenyl)methane formed in the condensation reaction, and to aid in maintaining the emulsion of the reactants in the acid, the improvement which comprises raising the temperature of the reacting mass when the condensation is substantially complete to liquefy all the trichloromethyl di(para-chlorophenyl)methane and to form a two-phase liquid system, one phase containing trichloromethyl di(para-chlorophenyl)methane and unreacted monochlorobenzene and the other phase containing aqueous sulfuric acid and sulfonated monochlorobenzene, allowing separation of the liquid system into two layers by the action of gravity, one layer consisting of the phase containing trichloromethyl di(para-chlorophenyl)methane and unreacted monochlorobenzene and the other layer consisting of the phase containing aqueous sulfuric acid and sulfonated monochlorobenzene and recovering the layer containing trichloromethyl di(para-chlorophenyl)methane.

3. In a process for the manufacture of trichloromethyl di(para-chlorophenyl)methane wherein the reactants, chloral and monochlorobenzene, are emulsified in 95 to 98 per cent sulfuric acid at a temperature of 10 to 40° C. to form a reacting mass, wherein monochlorobenzene is present initially in the reacting mass in amount insufficient to keep trichloromethyl di(para-chlorophenyl)methane from crystallizing out during the reaction, and wherein oleum and additional monochlorobenzene are added during the reaction while agitating and maintaining the temperature of the reacting mass at 10 to 40° C., the oleum being added to maintain the sulfuric acid strength in the reacting mass at from 95 to 98 per cent sulfuric acid, and the additional amount of monochlorobenzene being added to compensate for loss of the reactant monochlorobenzene by sulfonation, to serve as a solvent for part but not all of the trichloromethyl di(parachlorophenyl)methane formed in the condensation reaction, and to aid in maintaining the emulsion of the reactants in the acid, the improvement which comprises raising the temperature of the reacting mass when the condensation is substantially complete to liquefy all the trichloromethyl di(para-chlorophenyl)methane and to form a two-phase liquid system, one phase containing trichloromethyl di(para - chlorophenyl)methane and unreacted monochlorobenzene and the other phase containing aqueous sulfuric acid and sulfonated monochlorobenzene, agitating the liquid system to scrub the phase containing trichloromethyl di(para - chlorophenyl)methane with the phase containing sulfuric acid, then allowing separation of the liquid system into two layers by the action of gravity, one layer consisting of the phase containing trichloromethyl di(para-chlorophenyl)methane and unreacted monochlorobenzene and the other layer consisting of the phase containing aqueous sulfuric acid and sulfonated monochlorobenzene and recovering the layer containing trichloromethyl di(para-chlorophenyl)methane.

NORMAN E. SEARLE.

REFERENCES CITED

The following references are of record in the file of this patent:

UNITED STATES PATENTS

| Number | Name | Date |
|---|---|---|
| 1,638,045 | Livingston et al. | Aug. 9, 1927 |
| 2,329,074 | Müller | Sept. 7, 1943 |
| 2,370,558 | Mares | Feb. 27, 1945 |

OTHER REFERENCES

Callaham, "Chemical and Metallurgical Engineering," vol. 51, pages 112–114 (1944).

Brand et al., "Ber. der Deut. Chem. Gesell.," vol. 72, page 1031 (1939).

Iris et al., "Rev. Inst. Salub. Enferm. Trop.," vol. 5, page 73 (1944).

Beilstein, "Handbuch der Organischen Chemie," vol. V, page 606.

Chattaway, "Chemical Abstracts," vol. 28, col. 4718 (1934).